(12) United States Patent
Feng et al.

(10) Patent No.: US 11,138,494 B2
(45) Date of Patent: Oct. 5, 2021

(54) STORAGE CONTROLLER ACCELERATION FOR NEURAL NETWORK TRAINING AND INFERENCE

(71) Applicant: International Business Machines Corporation, Armonk, NY (US)

(72) Inventors: Minwei Feng, Yorktown Heights, NY (US); Yufei Ren, Somers, NY (US); Yandong Wang, Chicago, IL (US); Li Zhang, Yorktown Heights, NY (US); Wei Zhang, Elmford, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 924 days.

(21) Appl. No.: 15/584,136

(22) Filed: May 2, 2017

(65) Prior Publication Data

US 2018/0322383 A1    Nov. 8, 2018

(51) Int. Cl.
*G06N 3/063* (2006.01)
*G06N 3/04* (2006.01)
*G06N 3/08* (2006.01)

(52) U.S. Cl.
CPC ............ *G06N 3/063* (2013.01); *G06N 3/04* (2013.01); *G06N 3/084* (2013.01)

(58) Field of Classification Search
CPC ............ G06N 3/04; G06N 3/08; G06N 3/063
See application file for complete search history.

(56) References Cited

U.S. PATENT DOCUMENTS 8,131,659 B2    3/2012  Xu et al.
9,836,691 B1 *  12/2017 Narayanaswami .... G06N 3/063
(Continued)

FOREIGN PATENT DOCUMENTS

CN    101726481 A    6/2010

OTHER PUBLICATIONS

Chilimbi, Trishul, et al. "Project adam: Building an efficient and scalable deep learning training system." 11th USENIX Symposium on Operating Systems Design and Implementation (OSDI) 14). 2014, pp. 571-582 (Year: 2014).*

(Continued)

*Primary Examiner* — Kamran Afshar
*Assistant Examiner* — Randall K. Baldwin
(74) *Attorney, Agent, or Firm* — Garg Law Firm, PLLC; Rakesh Garg; Joseph Petrokaitis

(57) ABSTRACT

A storage controller of a machine receives training data associated with a neural network model. The neural network model includes a plurality of layers, and the machine further including at least one graphics processing unit. The storage controller trains at least one layer of the plurality of layers of the neural network model using the training data to generate processed training data. A size of the processed data is less than a size of the training data. Training of the at least one layer includes adjusting one or more weights of the at least one layer using the training data. The storage controller sends the processed training data to at least one graphics processing unit of the machine. The at least one graphics processing unit is configured to store the processed training data and train one or more remaining layers of the plurality of layers using the processed training data.

20 Claims, 6 Drawing Sheets

(56) References Cited

U.S. PATENT DOCUMENTS

| | | | | |
|---|---|---|---|---|
| 2005/0125369 | A1* | 6/2005 | Buck | G06K 9/00986 |
| | | | | 706/12 |
| 2014/0358547 | A1* | 12/2014 | Fernandez | G10L 13/04 |
| | | | | 704/259 |
| 2015/0324690 | A1* | 11/2015 | Chilimbi | G06N 3/08 |
| | | | | 706/25 |
| 2016/0171974 | A1* | 6/2016 | Hannun | G10L 15/063 |
| | | | | 704/232 |
| 2016/0314392 | A1* | 10/2016 | Honkala | G06N 3/0445 |
| 2016/0379109 | A1* | 12/2016 | Chung | G06N 3/04 |
| | | | | 706/26 |
| 2017/0098171 | A1* | 4/2017 | Kumar | G06N 3/084 |
| 2017/0109654 | A1* | 4/2017 | Caffrey | G06F 11/0781 |
| 2017/0124451 | A1* | 5/2017 | Barham | G06F 9/5038 |
| 2017/0124454 | A1* | 5/2017 | Vasudevan | G06F 9/5066 |
| 2017/0193361 | A1* | 7/2017 | Chilimbi | G06N 3/084 |
| 2018/0046903 | A1* | 2/2018 | Yao | G06N 3/0481 |
| 2018/0246853 | A1* | 8/2018 | Fowers | G06F 9/3891 |
| 2018/0285254 | A1* | 10/2018 | Baum | G06F 12/0692 |
| 2018/0315153 | A1* | 11/2018 | Park | G06T 1/20 |

OTHER PUBLICATIONS

Han, Song, Huizi Mao, and William J. Dally. "Deep compression: Compressing deep neural networks with pruning, trained quantization and huffman coding." arXiv preprint arXiv:1510.00149 2015, pp. 1-14 (Year: 2015).*

Qiu, Jiantao, et al. "Going deeper with embedded fpga platform for convolutional neural network." Proceedings of the 2016 ACM/SIGDA International Symposium on Field-Programmable Gate Arrays. 2016, pp. 26-35 (Year: 2016).*

Abadi, Martin, et al. "Tensorflow: Large-scale machine learning on heterogeneous distributed systems." arXiv preprint arXiv: 1603.04467 2016, pp. 1-19 (Year: 2016).*

Han, Song, et al. "EIE: efficient inference engine on compressed deep neural network." ACM SIGARCH Computer Architecture News 44.3 2016: 243-254. (Year: 2016).*

Figurnov et al. "Perforated CNNs: Acceleration through elimination of redundant convolutions." Advances in Neural Information Processing Systems. 2016: 1-9 (Year: 2016).*

Zhang, Wei, et al. "GaDei: On Scale-up Training as a Service for Deep Learning." arXiv preprint arXiv: 1611.06213v2 (Oct. 3, 2016): 1-14 (Year: 2016).*

Hubara, Itay, et al. "Binarized neural networks." Proceedings of the 30th International Conference on Neural Information Processing Systems. 2016: 1-9. (Year: 2016).*

Nazri Mohd Nawi et al; The Effect of Data Pre-Processing on Optimized Training of Artificial Neural Networks, The 4th Conference of Electrical Engineering and Informatics, Elsevier, ICEEI 2013, International.

Nallatech, FPGA Acceleration of Convolutional Neural Networks, 2016.

Willenberg et al; A Heterogeneous GASNet Implementation for FPGA-accelerated Computing, PGAS '14 Oct. 6-10, 2014, Eugene, OR, USA, http://dx.doi.org/10.1145/2676870.2676885.

Todman et al; Reconfigurable computing: architectures and design methods, IEE Proc.-Comput. Digit. Tech., vol. 152, No. 2, Mar. 2005.

Campton et al; Reconfigurable Computing: A Survey of Systems and Software, ACM Computing Surveys, vol. 34, No. 2, Jun. 2002, pp. 171-210.

Li et al; Reconfigurable Active Drive: An FPGA Accelerated Storage Architecture for Data-Intensive Applications, 2009.

* cited by examiner

STORAGE CONTROLLER ACCELERATION FOR NEURAL NETWORK TRAINING AND INFERENCE

TECHNICAL FIELD

The present invention relates generally to a method, system, and computer program product for acceleration of training and inference in neural networks. More particularly, the present invention relates to a method, system, and computer program product for storage controller acceleration for neural network training and inference.

BACKGROUND

Neural networks, especially deep learning neural networks continue to be used in more and more artificial intelligence applications such as image processing, video processing, voice recognition, questioning and answering, and machine translation. Many of these application areas have common characteristics of requiring a large amount of data to be processed for training of the neural network, employing complex neural network models having many layers, and requiring a large amount of processing power to train the model. Often, graphics processing units (GPUs) are used to train neural networks. However, moving large amounts of data into GPU memory can be very time intensive.

SUMMARY

The illustrative embodiments provide a method, system, and computer program product. An embodiment of a method includes receiving, by a storage controller of a machine, training data associated with a neural network model. In the embodiment, the neural network model includes a plurality of layers, and the machine further including at least one graphics processing unit. In the embodiment, the method further includes training, by the storage controller, at least one layer of the plurality of layers of the neural network model using the training data to generate processed training data. In the embodiment, a size of the processed data is less than a size of the training data, and training of the at least one layer includes adjusting one or more weights of the at least one layer using the training data. In the embodiment, the method further includes sending, by the storage controller, the processed training data to at least one graphics processing unit of the machine. In the embodiment, the at least one graphics processing unit is configured to store the processed training data and train one or more remaining layers of the plurality of layers using the processed training data.

In an embodiment, the training comprises performing a convolution operation on the training data, wherein the convolution operation comprises convolving the training data with the one or more weights of the at least one layer. In an embodiment, the method further includes receiving at least one gradient computed by the at least one graphics processing unit resulting from the training of the remaining layers. In another embodiment, the method further includes refining training of the at least one layer using the at least one gradient.

In a particular embodiment, the training data comprises image data. In another particular embodiment, the storage controller comprises a disk controller. In still another particular embodiment, the storage controller comprises a field-programmable gate array (FPGA).

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
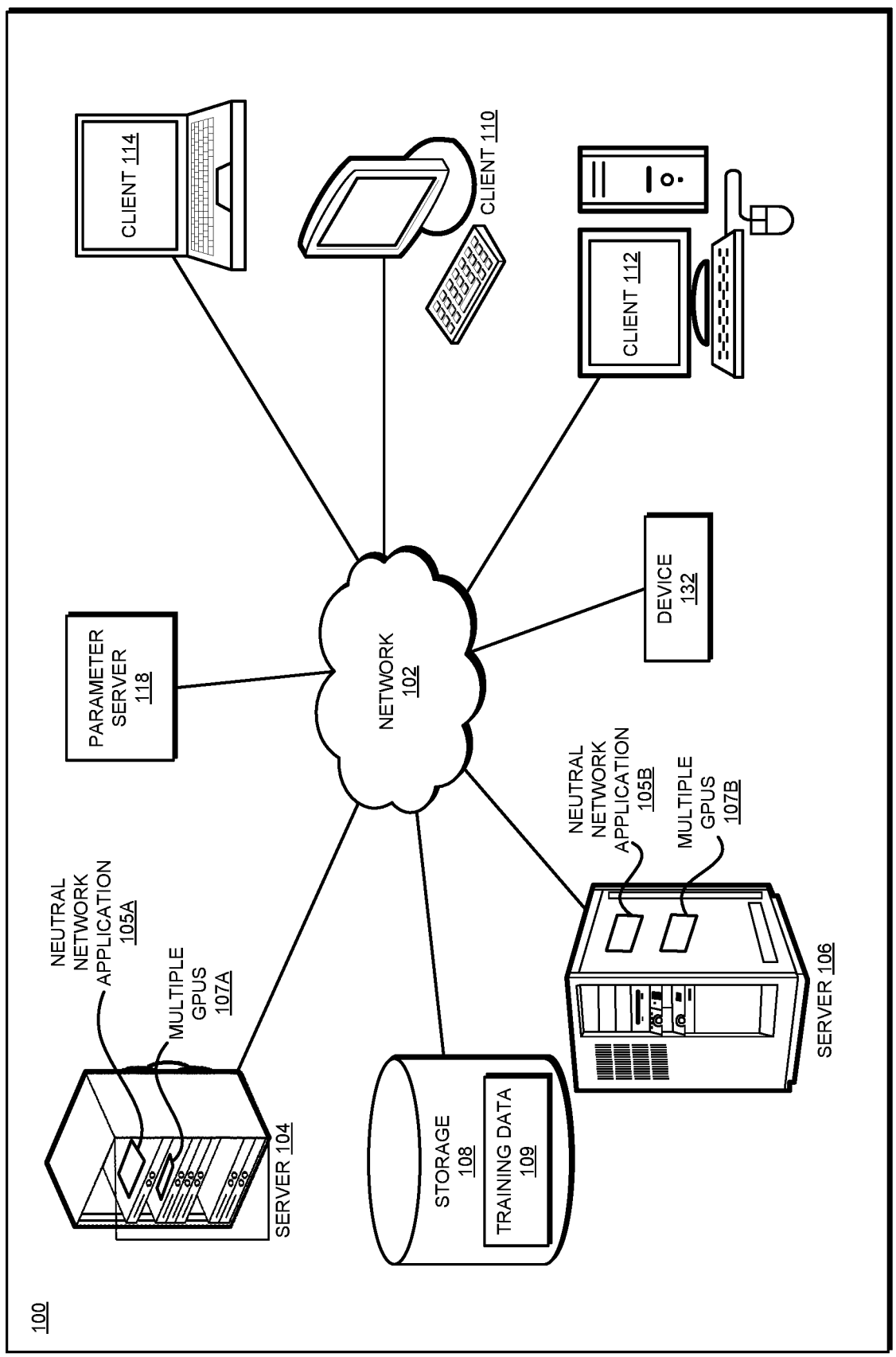
FIG. 1 depicts a block diagram of a network of data processing systems in which illustrative embodiments may be implemented.

The illustrative embodiments described herein generally relate to storage controller acceleration of training and inference for neural networks. In accordance with one or more embodiments, a machine, such as a server data processing system, includes a host CPU, host memory, a disk controller or other storage controller, a network interface controller (NIC), and multiple GPUs. In particular embodiments, a GPU card includes multiple GPUs upon the same card, and the GPU card is configured to be inserted into a node of the machine. In one or more embodiments, multiple machines, each having multiple nodes and GPUs, are in communication with each other to implement a neural network. In one or more embodiments, the disk controller includes circuitry and/or logic that allows communication between system components, such as the CPU, and a storage device. In a particular embodiment, the disk controller is a field-programmable gate array (FPGA) based disk controller.

In particular embodiments, a Peripheral Component Interconnect (PCI) root complex device connects the CPU and memory subsystem to each of the disk controller, GPUs and the NIC. In addition, multiple machines, each having multiple GPUs, are often networked together to implement a deep learning neural network. During training of the neural network, input data and workloads are distributed over GPUs on a cluster of machines such that each GPU computes parameters for the neural network that must be aggregated and synchronized between the GPUs. Often a parameter server is used to receive parameters from each GPU, aggregate the parameters, and provide updated parameters to each of the GPUs. In other implementations, the GPUs may use peer-to-peer communication to aggregate parameters. Iterative training algorithms such as a stochastic gradient descent algorithm often require the training status or parameters (e.g., a gradient) received from different GPUs to be aggregated and synchronized every few iterations.

In machine learning, a convolutional neural network (CNN) is a type of feed-forward artificial neural network in which the connectivity pattern between its nodes (neurons) is inspired by the organization of the animal visual cortex, whose individual neurons are arranged to respond to overlapping regions tiling a visual field. Convolutional networks mimic biological processes and are configured as variations of multilayer perceptrons designed to use minimal amounts of preprocessing while processing data, such as digital images.

Convolutional neural networks (CNN) are networks with overlapping "reception fields" performing convolution tasks. A CNN is particularly efficient in recognizing image features, such as by differentiating pixels or pixel regions in a digital image from other pixels or pixel regions in the digital image. Generally, a CNN is designed to recognize images or parts of an image, such as detecting the edges of an object recognized on the image. Computer vision is a field of endeavor where CNNs are commonly used.

A deep neural network (DNN) is an artificial neural network (ANN) with multiple hidden layers of units between the input and output layers. Similar to shallow ANNs, DNNs can model complex non-linear relationships. DNN architectures, e.g., for object detection and parsing, generate compositional models where the object is expressed as a layered composition of image primitives. The extra layers enable composition of features from lower layers, giving the potential of modeling complex data with fewer units than a similarly performing shallow network. DNNs are typically designed as feedforward networks.

Many large-scale data-intensive applications rely on both input data and a large number of model parameters to conduct computations. Deep learning algorithms are typical examples of this category. Machine learning algorithms generate models to fit training data and then use the generated models to generate predictions for input data. Models are generally mathematical equations and/or logic having model parameters. Model training is used to find appropriate values of the model parameters, e.g., weights of neural nodes in a neural network, so that the models can provide accurate predictions. In a typical example of training of a model, a batch of image data is input to a model and computations are performed on the image data using the model to provide an output used to train the model.

As the network is trained, the neurons in the intermediate layers organize themselves in such a way that the different neurons learn to recognize different characteristics of a total input space. After training, when an arbitrary input is input to the neural network, neurons in the hidden layer of the network respond with an active output if the new input contains a pattern that resembles a feature that the individual neurons have learned to recognize during their training.

Gradients generated for different items within the same batch are accumulated during batch processing, and normalized at the end of the batch resulting in an iteration for each batch processing. Current deep learning frameworks utilize multiple local graphics processing units (GPUs) to accelerate training. Local GPUs are GPUs that are located within a single node of a machine. Distributed GPUs are GPUs that are located in different machines in communication with one another over a network.

In conventional implementations of employing GPUs for training of neural networks, a large amount of data must typically be moved from storage into GPU memory to allow the GPUs to perform training operations of the neural network. For example, for climate/weather related data, each input record is composed of images of a location including temperature, humidity, wind speed, cloud cover, and other weather data. In a typical example, the climate/weather related data can consume as much as 40 megabytes (MB) of data per image. In a typical situation, moving this amount of data into GPU memory in order to train the neural network can consume a large amount of time and network bandwidth. Accordingly, there is a need to accelerate the process of moving data into GPU memory in order to speed up the overall training and inference operations of neural networks. Inference refers to utilizing the trained neural network to produce a result in response to a new input to the neural network.

Preprocessing of training data within neural networks is often performed to improve the neural network training process such as to improve the accuracy of the training of the neural network or reduce the computational complexity of the training process. For example, data compression may be performed on the training data to reduce the dimensionality of the training data to reduce the computational complexity of the training process. In another example, data sampling may be performed to, for example, downsample the training data to reduce the size of the training data prior to training. In still another example, data aggregation may be performed on the training data to aggregate the training data prior to training the neural network model.

In accordance with one or more embodiments, instead of moving the original training data from storage into GPU memory for processing, a disk controller of a machine retrieves the original training data from a storage device, performs preprocessing of the original training data to reduce the size of the original training data, and transfers the reduced training data into GPU memory of one or more GPUs for further processing of the training data by the GPU(s) to complete the training of the neural network. In particular embodiments, the disk controller of a machine performs preprocessing of the training data by performing one or more of data compression, data sampling, and data aggregation upon the training data.

In one or more embodiments, training of a neural network model includes forward pass training operations and backward pass training operations. During a forward pass, training data is input through the neural network model in order to train and/or adjust weights within the neural network and generate output values. During a backward pass, gradients of an error of the output values and target values are calculated and passed back to the neural network input in order to refine training of the neural network by modifying the weights of the neural network using the calculated gradients. In other embodiments, the disk controller performs preprocessing of the training data by processing one or more initial layers of the neural network.

In one or more embodiments, a neural network model includes a chain of processing layers in which each layer performs a particular operation upon input data. In particular embodiments, an initial layer of the neural network model includes a convolution layer in which a convolution operation is performed on training data and the output of the convolution operation passed on to further layers of the neural network mode. In a particular embodiment, the disk controller computes model parameters of an initial convolution layer of a neural network model and passes the model parameter to one or more GPUs to compute the remaining layers of the neural network model. In one or more embodiments, the convolution operation includes convolving the training data with one or more weights of the convolution layer. In a particular embodiment, the disk controller may be a field-programmable gate array (FGPA) configured as a disk controller.

In one or more embodiments, the disk controller of a machine retrieves the training data from a storage device, processes one or more initial layers of the neural network model within the disk controller to produce one or more model parameters, and stores the model parameters associated with the one or more layers within memory associated with (e.g., inside) the disk controller. In one or more embodiments, the disk controller transfers the model parameters from the disk controller to GPU memory of one or more GPUs within the machine. In one embodiment, during a forward pass of the training procedure, the disk controller transfers the model parameters to the host CPU of the machine, the host CPU stores the model parameters within host memory associated with the host CPU, and the host CPU transfers the model parameters from the host memory to GPU memory associated within one or more of the GPUs of the machine. In another particular embodiment, the disk controller transfers the model parameters directly to the GPU memory without requiring use of the host CPU or host memory. In one or more embodiments, the model parameters are transferred directly to the GPU memory using a remote direct memory access (RDMA) procedure such as a GPUDirect RDMA procedure.

In one or more embodiments, during a backward pass of the training procedure, the GPU uses the model parameters computed with respect to the initial layers to complete training of the remaining layers of the neural network model. In particular embodiments, during a backward pass of the training procedure, the GPU computes gradients to refine the one or more initial layers, and transfers the gradients to the host CPU. In the embodiment, the host CPU stores the gradients within the host memory, and transfers the gradients to the disk controller. In the particular embodiment, the disk controller utilizes the gradients to refine the training/processing of the one or more initial layers of the neural network model by modifying the weights of the initial layers using the gradients.

In one or more embodiments, after training of the neural network, the storage controller is configured to accelerate inference operations of the neural network. As previously discussed, inference refers to utilizing the trained neural network to generate an output from a given input using a set of predefined parameters. In a particular embodiment, new input data is retrieved by the storage controller from a storage device, and the storage controller computes one or more initial layers of the previously trained neural network using the new input data. In the particular embodiment, the storage controller sends the results of the computation to one or more GPUs, or other processors, to compute the remaining layers of the neural network model upon the new input data.

In accordance with one or more embodiments, processing of one or more layers of a neural network model by a storage controller reduces the volume of data that must be transferred to the GPUs of a machine. In a particular example in which a neural network model is used for forecasting solar energy efficiency using weather related data, input data may include a four-dimensional weather data tensor of a size 30×6×256×256. The input tensor may be preprocessed by a storage controller to reduce the size of the input data to an output tensor of 160×4×31×31 resulting in a significant reduction in size and bandwidth usage during training of the neural network. In another particular example, a deep learning system utilizing health care data to support smart diagnosis, e.g., functional magnetic resonance imaging (fMRI) may have an four-dimensional fMRI input tensor of 50×20×256×256. The input tensor may be processed by a storage controller to reduce the size of the input data to an output tensor of 160×18×31×31 again resulting in a significant reduction in size and bandwidth usage during training of the neural network.

The illustrative embodiments are described with respect to certain types of disk controller, storage controllers, GPUs, machines, deep learning systems, neural networks, neural network models, neural network model parameters, procedures, transmissions, responses, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
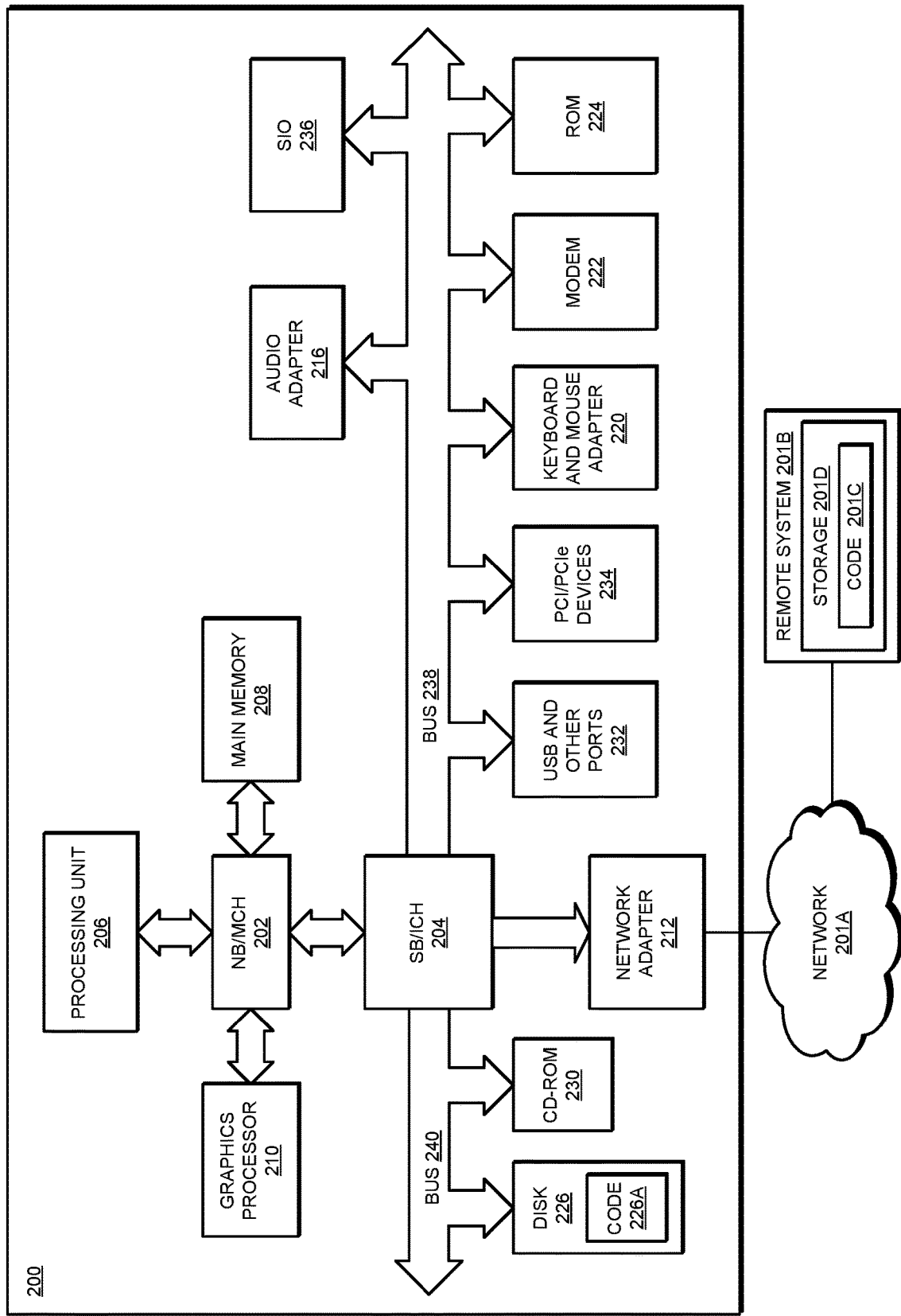
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. In one or more embodiments, storage 108 may be configured to store training data 109, such as image data, for training a neural network. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

In an embodiment, one or more of neural network application 105A of server 104 and neural network application 105B of server 106 implements an embodiment of a neural network, such as a deep learning neural network, as described herein. In a particular embodiment, the neural network is implemented using one of network application 105A and network application 105B within a single server. In another particular embodiment, the neural network is implemented using both neural network application 105A and neural network application 105B within a single server. Server 104 includes multiple GPUs 107A including multiple nodes in which each node may include one or more GPUs as described herein. Similarly, server 106 includes multiple GPUs 107B including multiple nodes in which each node may include one or more GPUs as described herein.

Parameter server 118 is an example of a parameter server as described herein. In one or more embodiments, parameter server 118 is configured to receive neural network model parameters from each GPU, aggregate the parameters, and provide updated parameters to each of the GPUs.

Device 132 is an example of a device described herein. For example, device 132 may send a request to server 104 to perform one or more data processing tasks by neural network applications 105A, 105B such as initiating training of the neural network. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Servers 104 and 106, storage unit 108, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as applications 105A and 105B in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. In another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
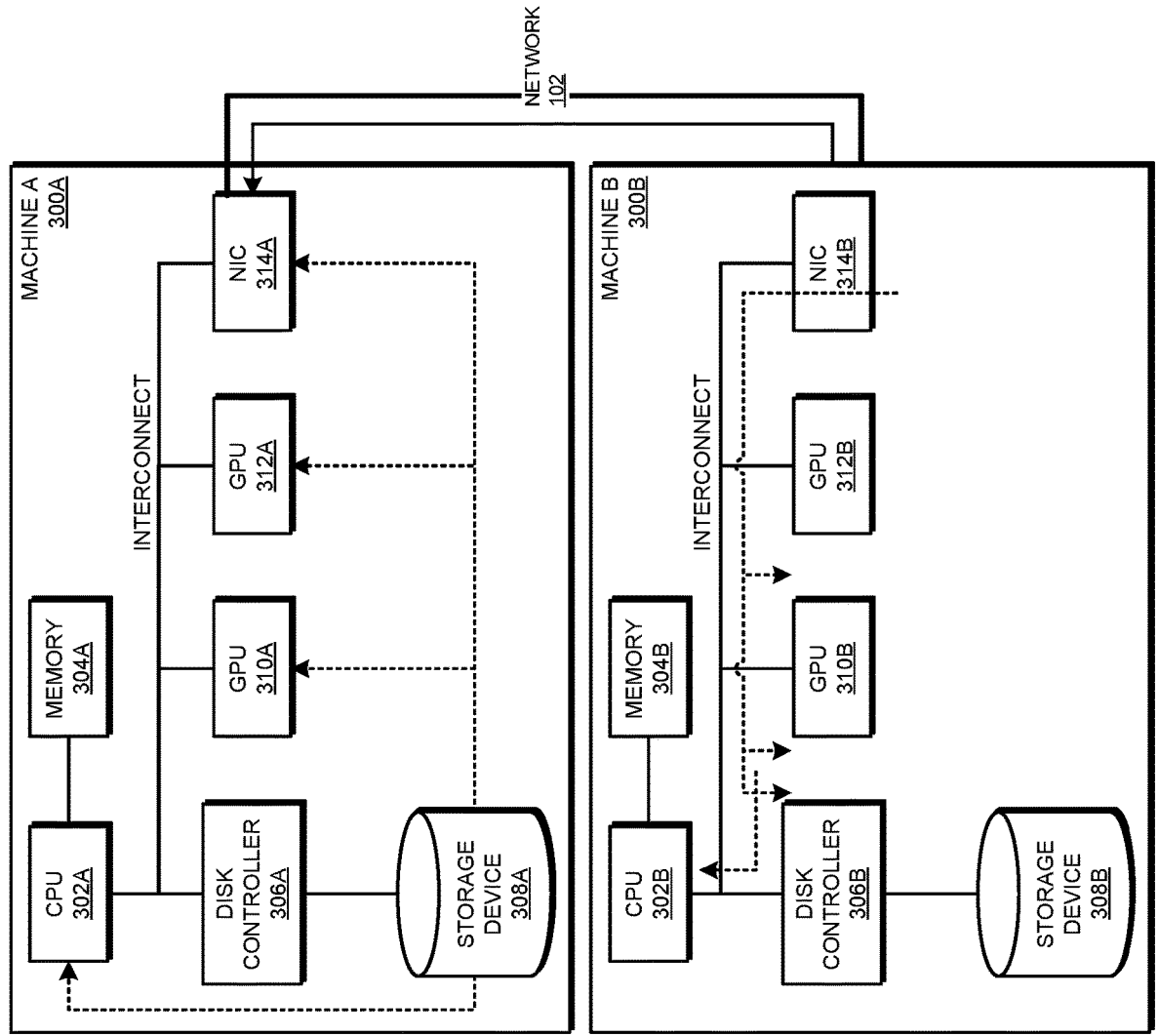
FIG. 3 depicts a simplified block diagram of a multi-machine multi-GPU architecture in which illustrative embodiments may be implemented.

With respect to FIG. 3, this figure depicts a simplified block diagram of a multi-machine multi-GPU neural network architecture in which illustrative embodiments may be implemented. In an embodiment, the neural network architecture includes a first machine 300A and a second machine 300B. In an embodiment, first machine 300A includes server 104 of FIG. 1 and second machine 300B includes server 106 of FIG. 1. In one or more embodiments, first machine 300A executes neural network application 105A and second machine 300B executes neural network application 105B to implement a deep learning neural network. In an embodiment, first machine 300A includes a CPU 302A, a memory 304A, a disk controller 306A, a storage device 308A, a first GPU 310A, a second GPU 312A, and a network interface controller (NIC) 314A. In the particular embodiment, CPU 302A, disk controller 306A, storage device 308A, first GPU 310A, second GPU 312A, and NIC 314A are in communication via a PCIe bus. In a particular embodiment, disk controller 306A includes a field-programmable gate arrays (FPGA).

Similarly, in the embodiment, second machine 300B includes a CPU 302B, a memory 304B, a disk controller 306B, a storage device 308B, a first GPU 310B, a second GPU 312B, and a network interface controller (NIC) 314B. In the particular embodiment, CPU 302B, disk controller 306B, storage device 308B, first GPU 310B, second GPU 312B, and NIC 314B are in communication via a PCIe bus. In the particular embodiment, NIC 314A of first machine 300A and NIC 314B of second machine 300B are in communication with one another via network 102.

In one or more embodiments, disk controller 306A retrieves a portion of training data associated with a neural network model from storage device 308A and stores the training data within memory associated (or within) disk controller 306A. In the embodiment, disk controller 306A processes the retrieved portion of the training data within disk controller 306A. In a particular embodiment, disk controller 306A includes a processor configured to process the retrieved portion of the training data. In a particular embodiment, disk controller 306A processes the training data by preprocessing the training data within disk controller 306A such as performing one or more of data compression, data sampling, or data aggregation on the training data. In another particular embodiment, disk controller 306A processes the retrieved training data by training one or more layers of the neural network model using the retrieved training data within disk controller 306A.

In one or more embodiments, a neural network model includes a convolution layer as an initial layer to perform convolution operations on input training data. In a particular embodiment, disk controller 306A processes the retrieved training data by performing a convolution operation on the retrieved training data to process an initial layer of the neural network model.

After processing the retrieved portion of the training data, disk controller 306A sends the processed training data to one or more of first GPU 310A and second GPU 312A, and one or more of first GPU 310A and second GPU 312A uses the processed training data to continue training the remaining layers of the neural network. In one or more embodiments, the processed training data includes model parameters (e.g., weights) associated with the processed layers of the neural network model. In a particular embodiment, disk controller 306A sends the processed training data to CPU 302A, CPU 302A stores the processed training data within memory 304A, and CPU 302A transfers the processed training data to one or more of first GPU 310A and second GPU 312A. In another particular embodiment, disk controller 306A sends the processed training data to one or more of first GPU 310A and second GPU 312A without utilizing CPU 302A.

In an embodiment, one or more of disk controller 306A, first GPU 310A and second GPU 312A sends model parameters associated with one or more neural network layers to second machine 300B either directly or via a parameters server, such as parameter server 118. In one or more embodiments, second machine 300B utilizes the received model parameters to train layers of the neural network model. Accordingly, first machine 300A and second machine 300B may maintain synchronization between distributed processing of the neural network model.

In some embodiments, one or more of first GPU 310A and second GPU 312A computes gradients during processing of the training data and sends the gradients to disk controller 306A during a backward pass of the training process. In particular embodiments, one or more of first GPU 310A and second GPU 312A sends the computed gradients to CPU 302A, CPU 302A stores the gradients in memory 304A, and CPU 302A sends the gradients to disk controller 306A. In one or more embodiments, disk controller 306A utilizes the computed gradients to further training one or more layers of the neural network.

Figure 4:
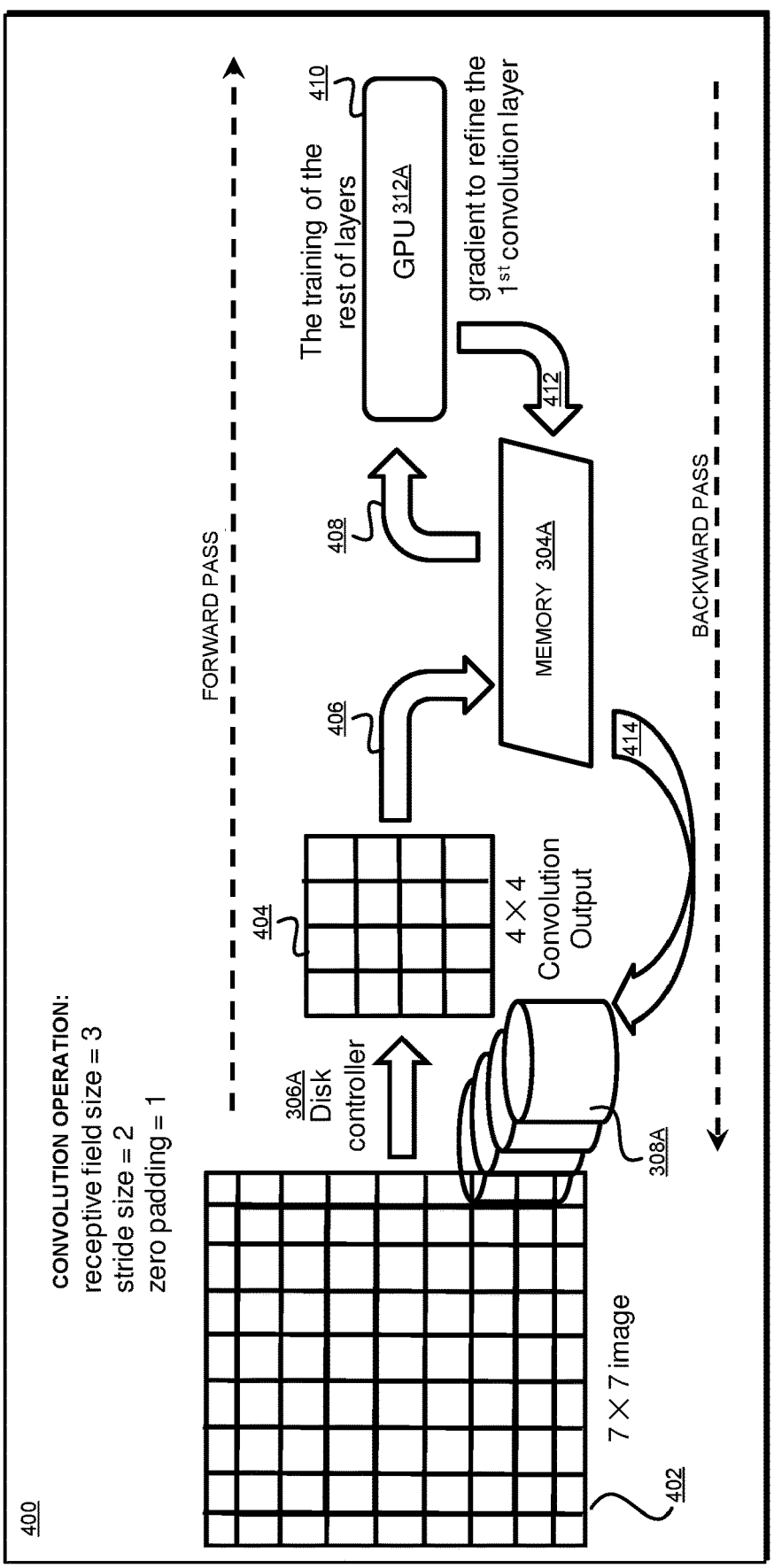
FIG. 4 depicts a simplified example of a disk controller-based convolution operation according to an illustrative embodiment.

With respect to FIG. 4, this figures depicts a simplified example of a disk controller-based convolution operation according to an illustrative embodiment. In the example convolution operation, disk controller 306A retrieves training data including a 7×7 image 402 from storage device 308a. Disk controller 306A further performs a convolution operation as a first layer of the neural network model. In the particular illustrated example, the convolution operation has a receptive filed size=3, a stride size=2, and a zero padding=1 upon the 7×7 image to produce a convolution output 404. The receptive field size is equivalent to the filter size of the filter used during the convolution operation. The stride size determines the slide of the filter during the convolution operation. The zero padding indicates the number of zero values that are inserted around the edges of the 7×7 image during the convolution operation.

In the illustrated example, the convolution output 404 is a 4×4 image. Accordingly, the original training data is reduced from a 7×7 size to a 4×4 size. In an operation 406, disk controller 306A sends convolution output 404 to CPU 302A, and CPU 302A stores convolution output 404 within memory 304A. In an operation 408, CPU 302A retrieves convolution output 404 from memory 304A and sends convolution output 404 to GPU 312A. In an operation 410, GPU 312A continues training the rest of the layers of the neural network model using the convolution output 404.

In one or more embodiments, in an operation 412, GPU 312A computes gradients to refine the first convolution layer, sends the gradients to CPU 302A, and CPU 302A stores the gradients in memory 304A. In the embodiment, CPU 302A retrieves the gradients from memory 304A and sends the gradients to disk controller 306A. In the embodiment, disk controller 306A utilizes the gradients to refine the first layer convolution operation.

Figure 5:
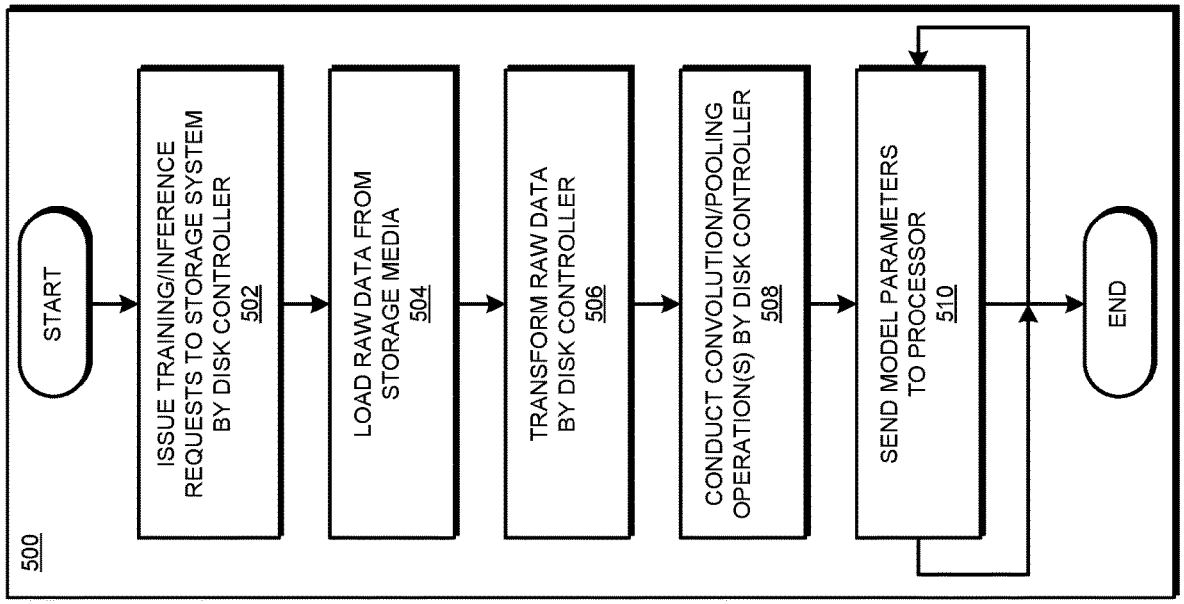
FIG. 5 depicts a flowchart of an example process for training a neural network by a disk controller.

With reference to FIG. 5, this figure depicts a flowchart of an example process 500 for training a neural network by a disk controller. In the example of FIG. 5, disk controller 306A performs a forward pass of a training operation of the neural network. In block 502, disk controller 306A issues one or more training/inference requests to a storage system including storage device 308A. In block 504, disk controller 306A loads raw training data, such as image data, from the storage media (e.g., storage device 308A) of the storage system. In block 506, disk controller 306A transforms the raw training data into a format suitable for further processing the training data using one or more layers of the neural network model. In particular embodiments, disk controller 306A transforms the raw training data by performing one or more of data compression, data sampling, data aggregation, image manipulation (e.g., cropping or transposing) upon the raw training data.

In 508, disk controller 306A processes the training data utilizing the one or more layers of the neural network model by conduction one or more of convolution and/or pooling operations on the training data to generate model parameters. In block 510, disk controller 306A sends the model parameters to processor memory of the machine. In one or more embodiments, the model parameters include neuron values of the processed layer(s). In particular embodiments, disk controller 306A sends the model parameters to host memory (e.g., memory 304A) associated with a host processor (e.g. CPU 302A) of the machine. In particular embodiments, the host processor is configured to copy the model parameters to memory associated with one or more GPUs such as GPU 310A. In one or more embodiments, the one or more GPUs are configured to further process one or more remaining layers of the neural network utilizing the model parameters until the neural network is trained. The process 300 then ends.

Figure 6:
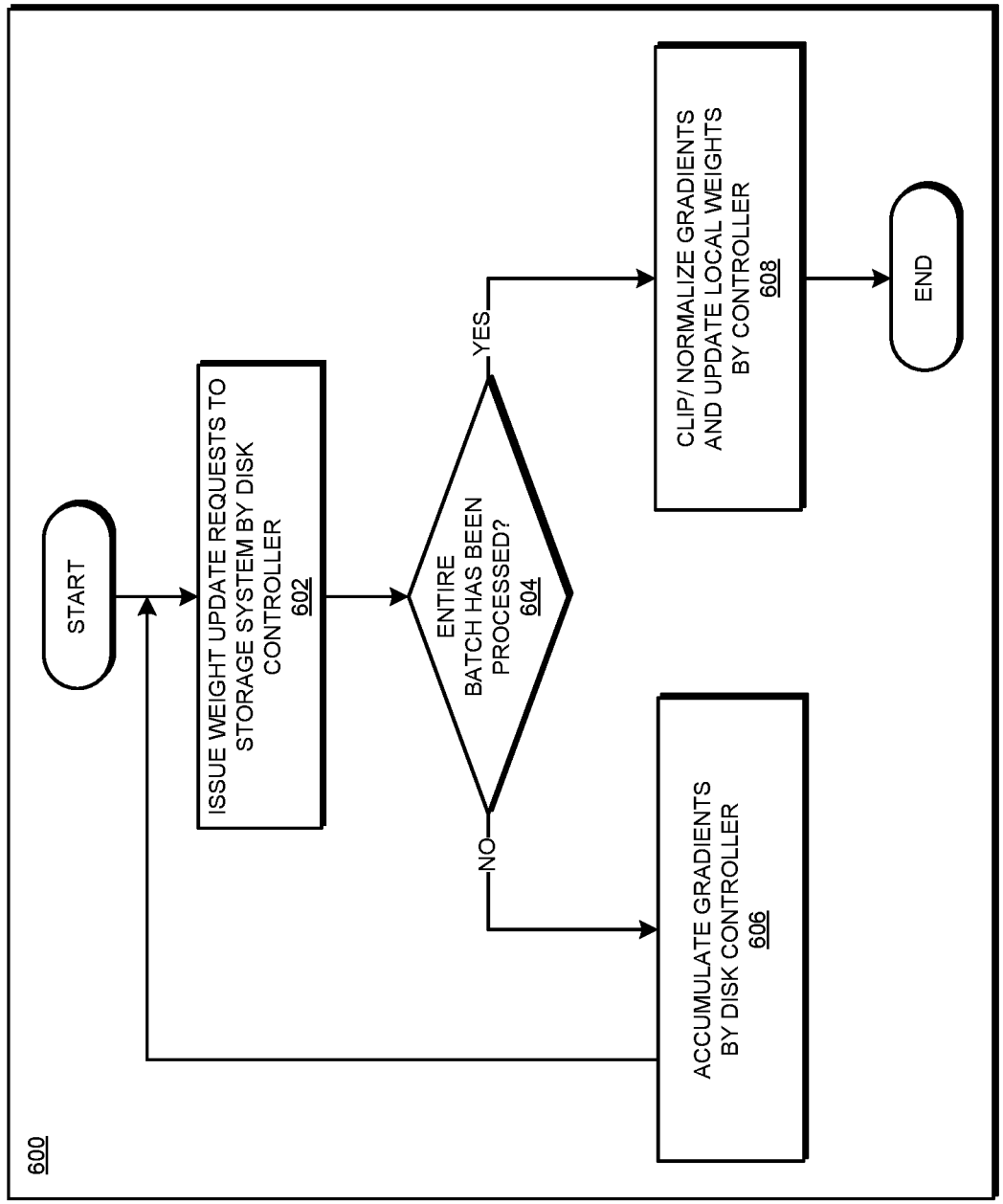
FIG. 6 depicts a flowchart of another example process for training a neural network by a disk controller.

With reference to FIG. 6, this figure depicts a flowchart of another example process 600 for training a neural network by a disk controller. In the example of FIG. 6, disk controller 306A performs a backward pass of a training operation of the neural network. In block 602, disk controller 306A issues a weight update request to the storage system including storage device 308A for receiving updated weight parameters including one or more gradients received from one or more GPUs. In one or more embodiments, the gradients are computed by the one or more GPUs during training of one or more layers of the neural network. In block 604, disk controller 306A determines whether an entire batch of gradients has been processed by the one or more GPUs. If the entire batch of gradients has not been processed, disk controller 306A continues to accumulated the gradients received from the GPUs in block 606. If the entire batch of gradients has been processed, disk controller 306A clips and/or normalizes the gradients and updates the local weights on the initial neural network model layers. The process 600 then ends.

Although in various embodiments processes are described as being performed a disk controller, in other embodiments the processes may be performed by other types of storage controllers.

Although various embodiments are described with respect to operations within a neural network, it should be understood that the principles described herein may be applied to any suitable data processing operations performed by a computer system or other electronic device.

Thus, a computer implemented method, system or apparatus, and computer program product are provided in the illustrative embodiments for local multicast operations with a neural network and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of accelerating data loading from storage comprising:
   receiving, by a storage controller of a machine, training data associated with a neural network model, the neural network model including a plurality of layers, and the machine further including at least one graphics processing unit;
   training, by the storage controller, at least one initial layer of the plurality of layers of the neural network model using the training data to generate a trained neural network and processed training data, wherein a size of the processed data is less than a size of the training data, wherein the training data comprises a tensor having a first number of dimensions and wherein the processed training data comprises another tensor with the first number of dimensions but with a reduced size of at least one of the dimensions; and
   sending, by the storage controller, the processed training data to at least one graphics processing unit of the machine that is different from the storage controller, the at least one graphics processing unit configured to store the processed training data and train one or more remaining layers of the plurality of layers using the processed training data,
   wherein the storage controller performs a backwards propagation during which, the storage controller issues a weight update request for receiving updated weight parameters that include one or more gradients computed by the at least one graphics processing unit during the training of the one or more remaining layers, wherein the storage controller determines whether an entire batch of gradients has been processed by the at least one graphics processing unit;
   responsive to determining that the entire batch of gradients has been processed, clipping and/or normalizing the one or more gradients and updating one or more weights of the at least one initial layer;
   computing, by the storage controller as part of an inference operation, at least one initial layer of the trained neural network using input data; and
   sending, by the storage controller, results of the computing of the at least one initial layer to at least one graphics processing unit of the machine that is different from the storage controller, the at least one graphics processing unit configured to compute one or more remaining layers of the trained neural network.

2. The method of claim 1, wherein the training comprises performing a convolution operation on the training data, wherein the convolution operation comprises convolving the training data with the one or more weights of the at least one initial layer.

3. The method of claim 1, further comprising refining training of the at least one layer using the one or more gradients.

4. The method of claim 1, wherein the training data comprises image data.

5. The method of claim 1, wherein the storage controller comprises a disk controller, and
   wherein the sending of the processed training data to at least one graphics processing unit comprises:
   sending the processed training data from the disk controller to a CPU;
   storing the processed training data in the CPU; and sending the processed training data from the CPU to the at least one graphics processing unit.

6. The method of claim 1, wherein the storage controller comprises a field-programmable gate array (FPGA).

7. A computer usable program product comprising one or more computer-readable storage devices, and program instructions stored on at least one of the one or more storage devices, the stored program instructions comprising:
    program instructions to receive, by a storage controller of a machine, training data associated with a neural network model, the neural network model including a plurality of layers, and the machine further including at least one graphics processing unit;
    program instructions to train, by the storage controller, at least one initial layer of the plurality of layers of the neural network model using the training data to generate processed training data, wherein a size of the processed data is less than a size of the training data, wherein the training data comprises a tensor having a first number of dimensions and wherein the processed training data comprises another tensor with the first number of dimensions but with a reduced size of at least one of the dimensions; and
    program instructions to send, by the storage controller, the processed training data to at least one graphics processing unit of the machine that is different from the storage controller, the at least one graphics processing unit configured to store the processed training data and train one or more remaining layers of the plurality of layers using the processed training data,
    wherein the storage controller performs a backwards propagation during which, the storage controller issues a weight update request for receiving updated weight parameters that include one or more gradients computed by the at least one graphics processing unit during the training of the one or more remaining layers, wherein the storage controller determines whether an entire batch of gradients has been processed by the at least one graphics processing unit;
    program instructions to, responsive to determining that the entire batch of gradients has been processed, clip and/or normalize the one or more gradients and update one or more weights of the at least one initial layer;
    program instructions to compute, by the storage controller as part of an inference operation, at least one initial layer of the trained neural network using input data; and
    program instructions to send, by the storage controller, results of the computing of the at least one initial layer to at least one graphics processing unit of the machine that is different from the storage controller, the at least one graphics processing unit configured to compute one or more remaining layers of the trained neural network.

8. The computer usable program product of claim 7, wherein the training comprises performing a convolution operation on the training data, wherein the convolution operation comprises convolving the training data with the one or more weights of the at least one initial layer.

9. The computer usable program product of claim 7, further comprising program instructions to refine training of the at least one layer using the one or more gradients.

10. The computer usable program product of claim 7, wherein the training data comprises image data.

11. The computer usable program product of claim 7, wherein the storage controller comprises a disk controller.

12. The computer usable program product of claim 7, wherein the storage controller comprises a field-programmable gate array (FPGA).

13. The computer usable program product of claim 7, wherein the computer usable code is stored in a computer readable storage device in a data processing system, and wherein the computer usable code is transferred over a network from a remote data processing system.

14. The computer usable program product of claim 7, wherein the computer usable code is stored in a computer readable storage device in a server data processing system, and wherein the computer usable code is downloaded over a network to a remote data processing system for use in a computer readable storage device associated with the remote data processing system.

15. A computer system comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:
    program instructions to receive, by a storage controller of a machine, training data associated with a neural network model, the neural network model including a plurality of layers, and the machine further including at least one graphics processing unit;
    program instructions to train, by the storage controller, at least one initial layer of the plurality of layers of the neural network model using the training data to generate processed training data, wherein a size of the processed data is less than a size of the training data, wherein the training data comprises a tensor having a first number of dimensions and wherein the processed training data comprises another tensor with the first number of dimensions but with a reduced size of at least one of the dimensions; and
    program instructions to send, by the storage controller, the processed training data to at least one graphics processing unit of the machine that is different from the storage controller, the at least one graphics processing unit configured to store the processed training data and train one or more remaining layers of the plurality of layers using the processed training data,
    wherein the storage controller performs a backwards propagation during which, the storage controller issues a weight update request for receiving updated weight parameters that include one or more gradients computed by the at least one graphics processing unit during the training of the one or more remaining layers, wherein the storage controller determines whether an entire batch of gradients has been processed by the at least one graphics processing unit;
    program instructions to, responsive to determining that the entire batch of gradients has been processed, clip and/or normalize the one or more gradients and update one or more weights of the at least one initial layer;
    program instructions to compute, by the storage controller as part of an inference operation, at least one initial layer of the trained neural network using input data; and
    program instructions to send, by the storage controller, results of the computing of the at least one initial layer to at least one graphics processing unit of the machine that is different from the storage controller, the at least one graphics processing unit configured to compute one or more remaining layers of the trained neural network.

16. The computer system of claim 15, wherein the training comprises performing a convolution operation on the training data, wherein the convolution operation comprises convolving the training data with the one or more weights of the at least one initial layer.

17. The computer system of claim 15, further comprising program instructions to refine training of the at least one layer using the one or more gradients.

18. The computer system of claim 15, wherein the training data comprises image data.

19. The computer system of claim 15, wherein the storage controller comprises a disk controller.

20. The computer system of claim 15, wherein the storage controller comprises a field-programmable gate array (FPGA).

* * * * *